United States Patent
Schmid et al.

(10) Patent No.: US 8,205,857 B2
(45) Date of Patent: Jun. 26, 2012

(54) PRESSURE REGULATING VALVE

(75) Inventors: Werner Schmid, Asperg (DE); Klaus Schudt, Nordheim (DE); Lothar Krauter, Bietigheim-Bissingen (DE); Guenther Krehl, Asperg (DE); Christof Ott, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 394 days.

(21) Appl. No.: 12/443,561

(22) PCT Filed: Sep. 13, 2007

(86) PCT No.: PCT/EP2007/059617
§ 371 (c)(1),
(2), (4) Date: Dec. 7, 2009

(87) PCT Pub. No.: WO2008/040618
PCT Pub. Date: Apr. 10, 2008

(65) Prior Publication Data
US 2010/0090142 A1    Apr. 15, 2010

(30) Foreign Application Priority Data
Oct. 2, 2006  (DE) .......................... 10 2006 046 825

(51) Int. Cl.
*F16K 31/02*  (2006.01)
(52) U.S. Cl. .............. 251/129.15; 137/625.65; 335/281; 335/297
(58) Field of Classification Search ............. 251/129.15; 137/625.65; 335/281, 297
See application file for complete search history.

(56) References Cited

U.S. PATENT DOCUMENTS

| | | | |
|---|---|---|---|
| 3,036,246 A * | 5/1962 | Valleau .................... | 335/297 |
| 4,443,775 A * | 4/1984 | Fujitani et al. .............. | 335/281 |
| 4,445,528 A | 5/1984 | Miki et al. | |
| 4,446,889 A * | 5/1984 | Sakakibara et al. ....... | 137/625.4 |
| 5,808,534 A * | 9/1998 | Laffey ...................... | 335/250 |
| 6,425,409 B1 | 7/2002 | Cross et al. | |
| 6,684,901 B1 | 2/2004 | Cahill et al. | |
| 7,172,171 B2 | 2/2007 | Doehla et al. | |
| 7,513,482 B2 * | 4/2009 | Shibata et al. .......... | 251/129.15 |
| 7,584,937 B2 * | 9/2009 | Oishi ...................... | 251/129.15 |
| 7,950,413 B2 * | 5/2011 | Fleischer et al. .......... | 137/487.5 |
| 2002/0038670 A1 * | 4/2002 | Matsusaka et al. ...... | 137/625.65 |
| 2004/0232763 A1 * | 11/2004 | Otsuka et al. ............. | 303/119.2 |
| 2004/0239178 A1 * | 12/2004 | Otsuka ....................... | 303/119.3 |
| 2006/0086396 A1 | 4/2006 | Ando | |
| 2006/0243938 A1 * | 11/2006 | Ishibashi et al. ......... | 251/129.15 |
| 2007/0158606 A1 * | 7/2007 | Oishi ....................... | 251/129.15 |
| 2009/0026399 A1 * | 1/2009 | Ishibashi ................. | 251/129.15 |

FOREIGN PATENT DOCUMENTS

| | | |
|---|---|---|
| DE | 10 2005 014 100 | 2/2006 |
| EP | 0 064 217 | 11/1982 |
| JP | 57022479 | 2/1982 |
| JP | 8-270619 | 10/1996 |

(Continued)

*Primary Examiner* — Eric Keasel
*Assistant Examiner* — Minh Le
(74) *Attorney, Agent, or Firm* — Michael J. Striker

(57) ABSTRACT

A pressure regulating valve (10) includes a magnet coil (16) received in a coil body (18), an armature (26) movable relative to a pole piece (20) for actuating a valve closing member (36), and a magnetic circuit (48) containing a magnet yoke (50). The magnetic circuit (48) has a maximum of three components (20, 66; 26, 50) that together form magnetic transitions (72, 74) oriented in the axial direction.

9 Claims, 3 Drawing Sheets

| | FOREIGN PATENT DOCUMENTS | | WO | 96/12905 | 5/1996 |
|---|---|---|---|---|---|
| JP | 11-218110 | 8/1999 | WO | 2004/036057 | 4/2004 |
| JP | 2001-74159 | 3/2001 | WO | WO 2006079434 A1 * | 8/2006 |
| JP | 2003-504584 | 2/2003 | | | |

* cited by examiner

PRESSURE REGULATING VALVE

CROSS-REFERENCE

The invention described and claimed hereinbelow is also described in PCT/EP2007/0659617, filed on Sep. 13, 2007 and DE 10 2006 046 825.2, filed on Oct. 2, 2006. This German Patent Application, whose subject matter is incorporated here by reference, provides the basis for a claim of priority of invention under 35 U.S.C. 119 (a)-(d).

BACKGROUND OF THE INVENTION

In gear systems, such as automatic transmissions for motor vehicles, hydraulically actuated clutches are used for changing gears. For the sake of shifting that proceeds without bucking, and to make the course of shifting imperceptible to the driver, it is necessary that the hydraulic pressure at the clutches of the automatic transmission be in accordance with predetermined pressure ramps with extreme pressure precision. Electromagnetically actuated pressure regulating valves are used to adjust these pressure ramps. These pressure regulating valves are preferably embodied on the order of a seat. The requisite pressure level is achieved via a pressure balance that is integrated with the valve, and a force of the electromagnet that is variable as a function of current is brought into pressure equilibrium with the hydraulic force on the valve seat of the pressure regulating valve. To achieve the requisite pressure precision, it is necessary first that the valve seat be manufactured with high precision and second that the magnetic force, which is variable by means of the coil current of the pressure regulating valve, extend in accordance with a precise characteristic curve and that this characteristic curve maintain its characteristic even at different valve strokes.

From International Patent Disclosure WO 2004/036057 A2, a controllable magnet valve is known, in which the magnetic circuit is closed via a magnet yoke. In this version, a first sealing body in the interior of a valve housing is movable in the axial direction between two terminal positions relative to its first valve seat, an interaction between a magnetic force engendered by electric current and a spring force counteracting the magnetic force. The interior extends from an electromagnet to a terminal. To make purposeful, replicable variation of the outflow speed of cylinder controllers in hydraulic drives easily possible, and to avoid uncontrolled motions by these drives, the first sealing seat, toward the first sealing body, is provided with an axially extending cylindrical housing, in which a slide is adjusted axially as a function of the electric current. The cylindrical housing has radially oriented openings, such that these openings are closed when the first sealing body is located in one terminal position in its first sealing seat or in the immediate vicinity of the first sealing seat, and these openings are opened when the first sealing body is in the opposite terminal position. In the version known from WO 2004/036057 A2, radial magnetic transitions are established between a magnet yoke and a rotary part. As a result, on the one hand a greater number of parts is required, and furthermore, a plurality of assembly processes are necessary. Finally, there is an extra magnetic gap between a bush and the armature of the magnet valve.

From German Patent Disclosure DE 10 2005 014 100 A1, an electromagnetic valve is known, in particular for slip-controlled motor vehicle brake systems. The electromagnetic valve includes two valve closing bodies and a magnet armature that is embodied movably relative to the first valve closing body in order to reduce the amount of electromagnetic energy required. In this version, however, achieving a centering bush entails not inconsiderable additional expense. This furthermore requires magnetic transitions extending in the radial direction, thus entailing greater complexity and expense for assembly. For instance, the bush must be joined and connected in material-locking fashion. There is furthermore the need to create a press fit between the magnet yoke and the magnet core. In the version known from DE 10 2005 014 100 A1, as well, there is an extra magnetic gap between a bush and the armature of the electromagnetic valve.

From German Patent DE 196 32 552 C1, an adjusting device for the magnetic resistance of a magnetic circuit in a magnet valve is known. In this version, the armature is located displaceably in a nonmagnetic armature bush inserted into the carrier, and there is an annular gap between the armature bush and the carrier. A pole piece is embodied as a first bush of magnetic material, surrounding the armature bush. Into the annular gap between the armature bush and the carrier, plus to the first bush, a second bush of nonmagnetic material and a third bush of magnetic material are inserted; the third bush protrudes through the part of a short-circuit yoke that is located diametrically opposite the part adjacent to the third bush. Because of the magnetic transition occurring in the radial direction, two extra magnetic gaps are created between a yoke and the armature. Moreover, a radial pressure between the yoke and a bush requires great precision in producing the yoke bore. If this high-precision production is not assured, major variation in the magnet force occurs because of the ensuing air gap variations.

SUMMARY OF THE INVENTION

The pressure regulating valve proposed according to the invention is distinguished in that the magnetic iron circuit of the pressure regulating valve is formed by a maximum of only three components. These components are a yokelike stamped and bent part for closing the magnetic circuit and a maximum of two machined rotary parts, whose diameters are no greater than an inner diameter of the winding. These parts of the magnetic iron circuit are connected to one another by simple joining processes, without requiring further additional parts, such as nonmagnetic bushes and the like. The stamped and bent part is preferably embodied as a yoke part and is mounted on the pressure regulating valve by means of a simple mounting operation effected in the transverse direction. The yokelike stamped and bent part for closing the magnetic circuit is held on the pole tube of the pressure regulating valve by its intrinsic axial prestressing. The pole tube is thus clamped between both cheeks of the yokelike stamped and bent part, and as a result, an otherwise necessary calking, welding or crimping process can be eliminated.

A further advantage of the pressure regulating valve proposed according to the invention and of the axial intrinsic prestressing implemented on it by the yokelike stamped and bent part is the fact that as a result of this, magnetic interruptions at the transition points from the yokelike stamped and bent part to the pole piece can be avoided. Because of the lack of magnetic interruptions, the magnetic efficiency of the magnetic iron circuit embodied on the proposed pressure regulating valve is quite high, since no gap losses occur. Moreover, greater precision of the magnetic force is obtained. The pressure regulating valve proposed according to the invention has the object of producing a precise regulating pressure by pressure reduction from a supply pressure $p_{Zu}$, that is predetermined by the system. The pressure supply $p_{Zu}$, is applied axially to the hydraulic part of the pressure regulating valve and reaches the regulating connection $p_R$ through a ball valve. This pressure acts on the face of a valve closing member of the pressure regulating valve and opens the valve seat by the resultant force. Opening the valve seat of the pressure regulating valve reduces the pressure $p_R$ into the outlet, until an equilibrium results between the force set in the electromagnet and the hydraulic force on the valve closing member. By varying the valve current and hence the magnetic force, the pressure $p_R$ can be set precisely to the required level.

BRIEF DESCRIPTION OF THE DRAWINGS

The invention will be described in further detail below in conjunction with the drawings.

DETAILED DESCRIPTION OF THE PREFERRED VARIANT EMBODIMENTS

Figure 1:
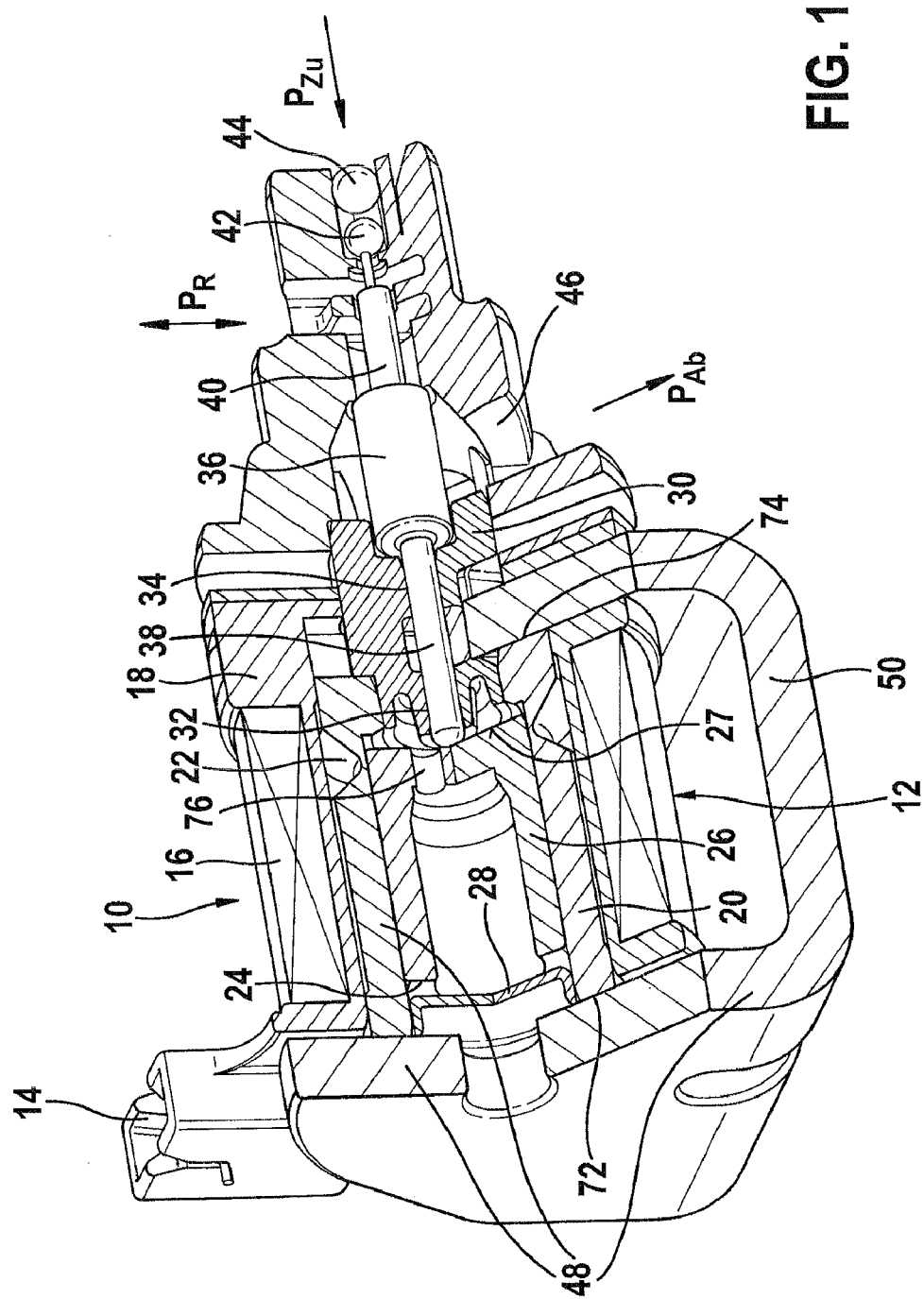
FIG. 1 shows a section through a pressure regulating valve proposed according to the invention.

The view in FIG. 1 shows a section through the pressure regulating valve proposed according to the invention.

In FIG. 1, a pressure regulating valve 10 can be seen in the housing 12 of which a plug connection 14 for electrical contacting is embodied. The pressure regulating valve 10 includes a magnet coil 16, which is embodied in a coil body 18. Reference numeral 20 indicates a pole piece of the pressure regulating valve 10 in the view in FIG. 1.

The pole piece 20 is created essentially as a bushlike component and includes a recess 22, made by turning on its outer circumferential surface 1, which is preferably made as a V-shaped groove. The recess 22 serves to force the magnetic flux from the pole piece 20 in the direction of an armature 26. The course of the field lines from the pole piece 20 into the armature 26 and back again to the pole piece 20 downstream of the recess 22 produces a force acting on the armature 26. Reference numeral 24 indicates a plunging stage of the armature 26. The iron region next to the recess 22 preferably made as a V-shaped groove forms the magnetic pole. The geometry of the recess 22 determines the course of the magnetic force over the valve stroke, that is, the armature stroke and the level of the magnetic force. Production-dictated variations in the recess 22 preferably made as a V-shaped groove on the pole piece 20 must be minimized in order to avoid controls in the magnetic force and a resultant impairment of the pressure $p_R$ to be regulated. The armature 26 is preferably made as a rotary part of cuplike configuration with a cylindrical jacket face. The cylindrical jacket face, together with the inside diameter of the pole piece 20, forms the bearing for the armature 26. To improve the sliding behavior, both the inside diameter of the pole piece 20 and the outside diameter of the cuplike armature 26 are embodied with high precision and high surface quality. At the armature 26, the edge between the jacket face and the face end forms the magnetic pole. High surface precision for the axial face on the armature 26 must be a goal, to achieve the greatest possible precision with regard to the magnetic force. An aperture 76 preferably embodied as a bore may extend in the end face of the armature 26 and assures the equalization of the medium during the motion of the armature 26.

It can be seen from FIG. 1 that a closure cap 28 is located on the side of the armature 26 remote from the axial face; this cap serves to seal off the armature chamber from invading dirt particles.

A slide bearing 30 is let into the coil body 18 of the pressure regulating valve 10, as seen in the section view in FIG. 1. The slide bearing 30 in the variant embodiment shown in FIG. 1 includes a first slide bearing guide 32 and a second slide bearing guide 34. A bearing journal 38, which is connected to a cylindrically embodied valve closing member 36, is guided in the latter slide bearing guide. On the face end of the cylindrical valve closing member 36 diametrically opposite the bearing journal 38, there is a tappet 40, which acts on a preferably ball-like closing body 42. A closure ball 44, which prevents the attached valve closing member 36 from being lost, is also located in the hydraulic part of the pressure regulating valve 10 shown in the sectional view in FIG. 1.

The supply pressure is identified by $p_{Zu}$ in the view in FIG. 1 and, once it has moved past the closure ball 44 via axial grooves, it acts on the ball-like closing body 42. A pressure to be regulated is identified by the symbol $p_R$; an outlet pressure, which prevails in an outlet opening 46 of the pressure regulating valve 10, is identified by $p_{Ab}$.

The pressure regulating valve 10 shown in FIG. 1 further includes a magnetic circuit 48, which is formed of a maximum of three components: a yokelike stamped and bent part 50, the armature 26 on which the aforementioned magnetic pole is embodied, and the pole piece 20 with its inside diameter embodied as a sliding face and with a specific pole geometry, to generate a magnetic force of the pressure regulating valve 10 that is independent of the stroke.

Figure 2:
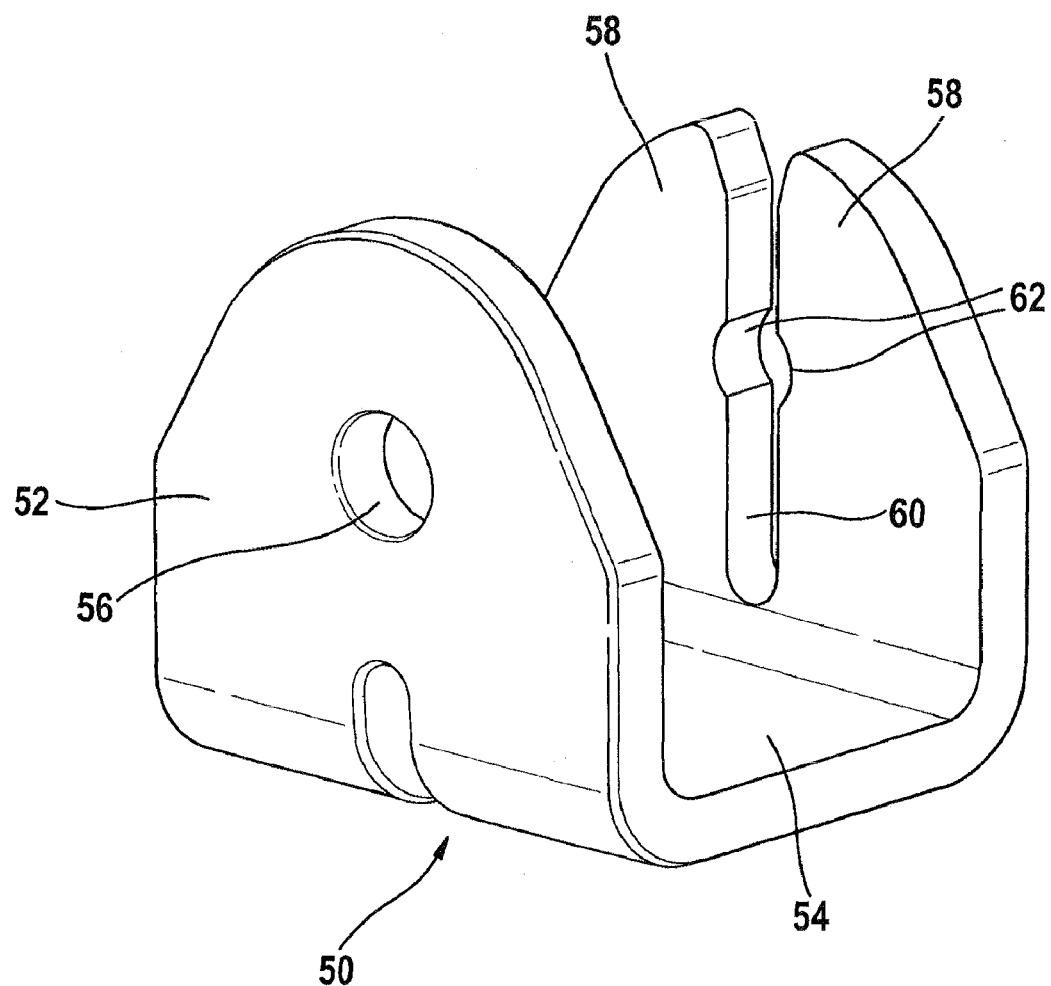
FIG. 2 is a perspective view of the yokelike stamped and bent part.

In FIG. 2, the yokelike stamped and bent part, which is a magnet yoke, is shown in a perspective view.

Figure 3:
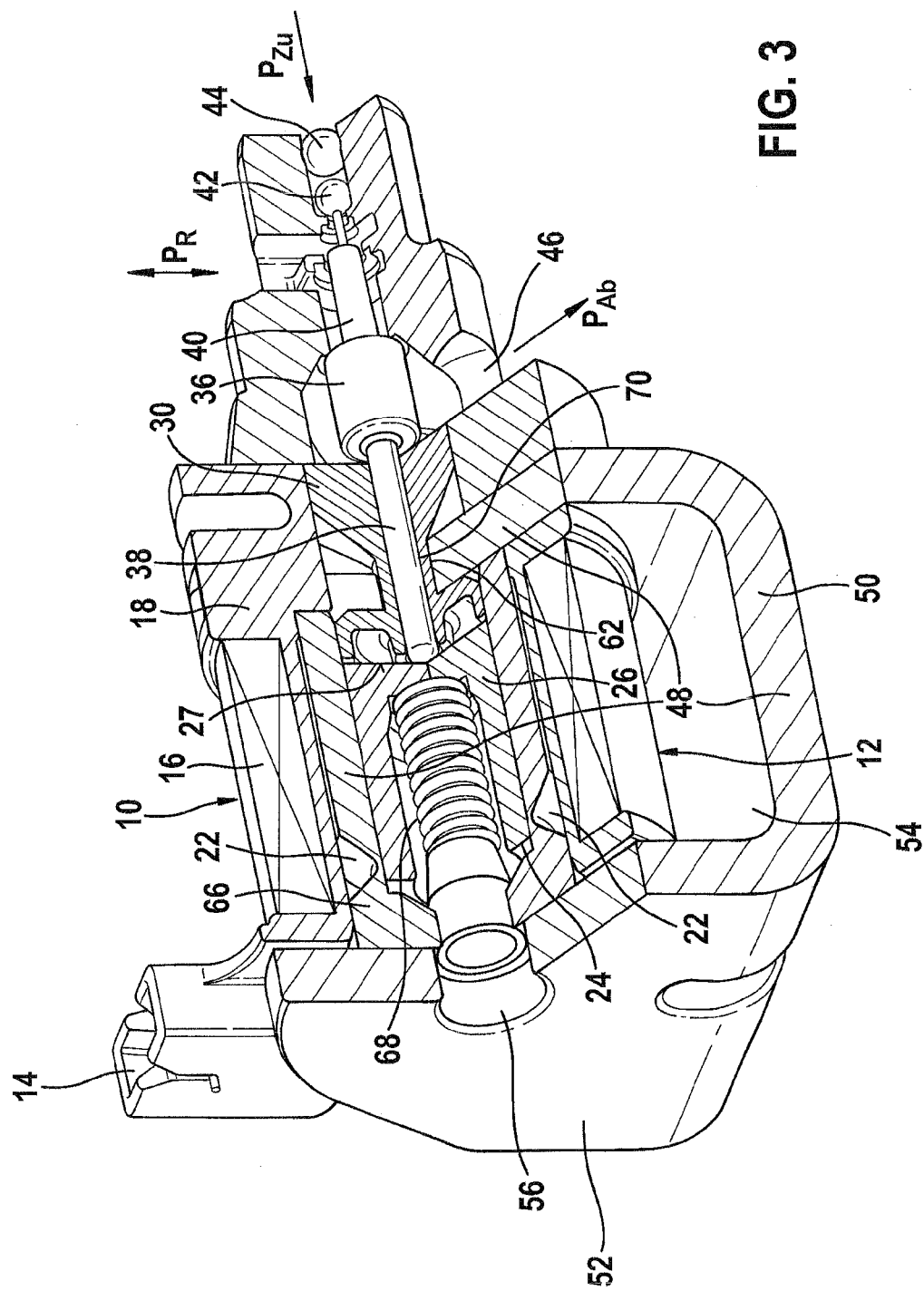
FIG. 3 is a sectional view through the pressure regulating valve proposed according to the invention, with an alternative possible embodiment of its pole piece.

It can be seen from the view in FIG. 2 that the yokelike stamped and bent part, which is identified as magnet yoke 50, is embodied as substantially C-shaped, and the pole piece 20 is located between a first yoke cheek 52 and a further, split, second yoke cheek 58. The pole piece 20 is received between the first yoke cheek 52 and the second, split yoke cheek 58 in such a manner that axial clamping ensues. To achieve this, the magnet yoke 50 in the unmounted state is slightly "overbent"; that is, the angle between the first yoke cheek 52 and the second, split yoke cheek 58 relative to a yoke base 54 is less than 90°. The first yoke cheek 52 and the second, split yoke cheek 58 are connected to one another via the yoke base 54 of the magnet yoke 50. A bore 56 is embodied in the first yoke cheek 52 and serves to adjust the compression spring 68 (FIG. 3). A slit 60, whose side edges represent a pole piece clamp 62, extends in the second, split yoke cheek 58 and defines a chamber in which a plastic rib is located. The magnet yoke 50 is mounted transversely to the axis of the pressure regulating valve 10 and in the process is slipped laterally onto the pole piece 20. In the mounting of the magnet yoke 50 in the transverse direction, the split, second yoke cheek 58 of the magnet yoke 50 is introduced into a shaft in the coil body 18. In the mounting of the magnet yoke in the transverse direction, the magnet yoke 50 becomes secured on the pole piece 20, magnetic transitions are formed between the pole piece 20 and the magnet yoke 50, preferably embodied as a yokelike stamped and bent part, and the pole piece 20 and the slide bearing 30 are fixed in the coil body 18. Also in the mounting of the magnet yoke 50, axial positioning of the magnet yoke 50 is effected relative to the coil body 18, since the split, second yoke cheek 58 of the magnet yoke 50 is secured in the axial direction in a recess in the coil body 18.

It can also be seen from the view in FIG. 1 that an end face of the bushlike pole piece 20 and the inside of a magnet yoke 50 form a first axial magnetic transition 72. Analogously, the other face end of the bushlike pole piece 20 and the inside of the other yoke cheek of the magnet yoke 50 form a second axial magnetic transition 74. The armature 26 guided in the inside diameter of the bushlike pole piece 20 has an armature end face 27, which to enable an exchange of media is equipped with an aperture 76 that is preferably made in the form of a bore.

From FIG. 2, a perspective view can be seen of the substantially C-shaped stamped and bent part of the magnetic circuit. From the view in FIG. 2, it can be seen that the magnet yoke 50 has a first yoke cheek 52, which includes an opening 26. The first yoke cheek 52 of the magnet yoke 50 is connected to a second, split yoke cheek 58 via the yoke base 54. The second, split yoke cheek 58 is penetrated by a slit 60, which forms the pole piece clamp 62 and forms space for a plastic rib.

From the view in FIG. 3, a variant embodiment can be seen of the pressure regulating valve proposed according to the invention, in which the pole piece has a different orientation.

In terms of its hydraulic part, the pressure regulating valve 10 proposed according to the invention and shown in a perspective sectional view in FIG. 3 is embodied analogously to the exemplary embodiment shown in FIG. 1 of the pressure regulating valve 10 proposed according to the invention.

Unlike the view of the variant embodiment in FIG. 1, a pole piece 66 is located in the coil body 18, and its recess 22 made preferably as a V-shaped groove has a magnetic pole which exerts force on the armature 26 in an opposite direction, compared to the exemplary embodiment shown in FIG. 1.

The armature 26, analogously to the exemplary embodiment of FIG. 1, is likewise received in the inside diameter of the pole piece 66, which is bushlike here as well. The cup-shaped armature 26 is provided with a compression spring 68, which positions the armature 26 and thus its armature end face 27 against the bearing journal 38 and thus urges the valve closing member 36 and the tappet 40 provided on it in the direction of closure of the valve seat. Compared to the exemplary embodiment shown in FIG. 1 of the pressure regulating valve 10 proposed according to the invention, the recess 22 preferably made as a V-shaped groove extends on the jacket face of the bushlike pole piece 20 along the region of the bushlike pole piece 66 oriented toward the first yoke cheek 52. Analogously to the exemplary embodiment shown in FIG. 1, a first axial magnetic transition 72 is defined by the inside of the first yoke cheek 52 and its contact with the face end, toward the first yoke cheek 52, of the pole piece 20. In addition, a second axial magnetic transition 74 is represented by the point of contact of the inside of the second, split 58 of the magnet yoke 50 with the face end diametrically opposite it of the bushlike pole piece 20. In the variant embodiment shown in FIG. 1 of the pressure regulating valve 10 proposed according to the invention, it is possible to achieve a rising characteristic pressure/current curve, while with the pressure regulating valve 10 shown in FIG. 3, whose cup-shaped armature 26 is acted upon by a compression spring 68, a descending characteristic pressure/current curve can be attained. The two pole pieces 20, 66 shown in the variant embodiments in FIGS. 1 and 3 differ in the location of the recess 22, embodied preferably as a V-shaped groove, on the jacket face of the pole piece 20, 66 and in the location, dependent thereon, of the magnetic pole by way of which the magnetic force is introduced into the cup-shaped armature 26. Reference numeral 24 indicates the plunging stage of the armature 26.

The pressure regulating valve 10 shown in the variant embodiments in FIGS. 1 and 3 is distinguished by a minimum number of components. The pressure regulating valve shown in FIGS. 1 and 3 includes the coil body 18 with an integrated hydraulic connection and valve seats embodied therein as well as the inlets and outlets. The magnet coil 16 is preferably embodied as a copper winding in the coil body 18. Both the closing element 44 acting to prevent loss and the component 42 acting as a valve element may be embodied spherically. The valve closing member 36 is guided in the magnetic transition 30 in either a first and second slide bearing guide 32, 34 or in a magnetic transition 30, which allows an individual guide 70 of a bearing journal 38 of the valve closing member 36.

A feature common to both variant embodiments is that the magnetic circuit 48 has a maximum of three components, which are the magnet yoke 50, acting as a yokelike flux guide baffle, the armature 26 with the magnetic pole and slide face, and the pole piece 20, 66 with a slide face and a specific magnetic pole geometry, dictated by the location of the recess 22, embodied in the outer circumference and preferably made as a V-shaped groove in the outer circumferential surface of the bushlike pole piece 20.

The magnet yoke 50 belonging to the two variant embodiments of the pressure regulating valve 10 proposed according to the invention is mounted transversely to the valve axis and in the process is slipped laterally onto the pole piece 20, 66. In the mounting in the transverse direction, the second, split yoke cheek 58 is simultaneously installed in a corresponding recess in the coil body 18, thereby achieving axial securing of the magnet yoke 50. With the transverse installation of the magnet yoke 50, the following operations are performed:

First, the securing of the magnet yoke 50 on the pole piece 20, 66 in the transverse direction is effected. In the process, the first axial magnetic transition 72 and the second axial magnetic transition between the pole piece 20, 66 and the magnet yoke 50, or in other words the insides of its first yoke cheek 52 and its second, split yoke cheek 58, are created. By the mounting of the magnet yoke 50 in the transverse direction on the pressure regulating valve 10, the fixation of the pole piece 20, 66 and of the slide bearing 30 for the valve closing member 36 in the coil body 18 is effected. Because of the engagement of the second, split yoke cheek 58 with a corresponding recess in the coil body 18, the magnet yoke 50 of the magnetic circuit 58 is simultaneously secured in the axial direction in the coil body 18.

The invention claimed is:

1. A pressure regulating valve (10), having a magnet coil (16) received in a coil body (18), an armature (26) movable relative to a pole piece (20), for actuating a valve closing member (36), and a magnetic circuit (48) containing a magnet yoke (50), characterized in that the magnetic circuit (48) has a maximum of three components (20, 66; 26, 50) that together form magnetic transitions (72, 74) oriented in the axial direction, wherein the magnetic circuit (48) includes at least one C-shaped magnet yoke (50) and one bushlike pole piece (20, 66), wherein the C-shaped magnet yoke (50) has a first yoke cheek (52) and a second, split yoke cheek (58), and wherein a first magnetic transition (72) oriented in the axial direction is embodied between the yoke cheek (52) and a first face end of the pole piece (20, 66), and a second magnetic transition (74) oriented in the axial direction is embodied between the second, split yoke cheek (58) and a second face end of the pole piece (20, 66).

2. The pressure regulating valve (10) as defined by claim 1, wherein the armature (26) is supported displaceably in the pole piece (20, 66).

3. The pressure regulating valve (10) as defined by claim 2, wherein the armature (26) is acted upon in the pole claim 2, wherein the armature (26) is acted upon in the pole piece (66) by a compression spring (68).

4. The pressure regulating valve (10) as defined by claim 1, wherein the second, split yoke cheek (58) engages the coil body (18).

5. The pressure regulating valve (10) as defined by claim 4, wherein the yoke cheeks (52, 58) of the C-shaped magnet yoke (50), in the state before assembly, form a bending angle <90° with one another relative to a yoke base (54).

6. The pressure regulating valve (10) as defined by claim 1, wherein the pole piece (20, 66), on its jacket face, has a recess (22) that is embodied in particular as a V-shaped groove and defines the location of a magnetic pole on the pole piece (20, 66).

7. The pressure regulating valve (10) as defined by claim 1, wherein the armature (26) has an end face (27) in which a aperture (76) that enables an exchange of media extends.

8. The pressure regulating valve (10) as defined by claim 1, wherein the magnet yoke (50) can be mounted on the coil body (18) in the transverse direction, is locked axially in the coil body (18) by one of the yoke cheeks (52, 58), and fixes a slide bearing (30) in the coil body (18), whose slide bearing guides (32, 34; 70) guide a bearing journal (38) of a valve closing member (36).

9. A pressure regulating valve (10), having a magnet coil (16) received in a coil body (18), an armature (26) movable relative to a pole piece (20), for actuating a valve closing member (36), and a magnetic circuit (48) containing a magnet yoke (50), characterized in that the magnetic circuit (48) has a maximum of three components (20, 66; 26, 50) that together form magnetic transitions (72, 74) oriented in the axial direction, wherein the magnetic circuit (48) includes at least one C-shaped magnet yoke (50) and one bushlike pole piece (20, 66), wherein the C-shaped magnet yoke (50) has a first yoke cheek (52) and a second, split yoke cheek (58), and wherein the yoke cheeks (52, 58) of the C-shaped magnet yoke (50), in the state before assembly, form a bending angle <90° with one another relative to a yoke base (54).

\* \* \* \* \*